(12) United States Patent
Roskind

(10) Patent No.: US 7,591,004 B2
(45) Date of Patent: *Sep. 15, 2009

(54) USING TRUSTED COMMUNICATION CHANNEL TO COMBAT USER NAME/PASSWORD THEFT

(75) Inventor: James Roskind, Redwood City, CA (US)

(73) Assignee: AOL LLC, a Delaware limited liability company, Dulles, VA (US)

( * ) Notice: Subject to any disclaimer, the term of this patent is extended or adjusted under 35 U.S.C. 154(b) by 851 days.

This patent is subject to a terminal disclaimer.

(21) Appl. No.: 11/193,831

(22) Filed: Jul. 28, 2005

(65) Prior Publication Data

US 2005/0262564 A1 Nov. 24, 2005

Related U.S. Application Data

(63) Continuation of application No. 10/323,230, filed on Dec. 18, 2002, now Pat. No. 6,938,167.

(51) Int. Cl.
*H04L 9/32* (2006.01)
*G06F 11/00* (2006.01)

(52) U.S. Cl. .................. 726/2; 726/3; 726/4; 726/22; 726/23

(58) Field of Classification Search ............ 726/2–4, 726/8–10, 15–16, 22–23; 713/176, 183–186
See application file for complete search history.

(56) References Cited

U.S. PATENT DOCUMENTS 4,926,481 A * 5/1990 Collins, Jr. ................ 713/184

5,418,854 A 5/1995 Kaufman
5,497,421 A 3/1996 Kaufman (Continued)

FOREIGN PATENT DOCUMENTS

EP 181503 5/1992

(Continued)

OTHER PUBLICATIONS

Chien, H. et al. "A Modified Remote Login Authentication Scheme Based on Geometric Approach." Journal of Systems and Software, Jan. 15, 2001.

(Continued)

*Primary Examiner*—Hosuk Song
(74) *Attorney, Agent, or Firm*—Michael A. Glenn; Glenn Patent Group

(57) ABSTRACT

A technique for defining a system with enhanced trust is disclosed, in which an immediate contact is made with the user on the enhanced trust system when a compromise is first detected. The service contacts the compromised user and asks for confirmation of the results. As a result, the true user on the enhanced trust machine is able to preclude a login or preclude a password change. In a first embodiment of the invention, an enhanced trust machine is a machine where the user is currently logged in at the time that the less trusted machine attempts a login. A second embodiment of the invention comprehends an enhanced trust machine where the user has logged in repeatedly over a course of numerous weeks, as compared with a lesser trusted machine that the user has never logged into before and which is now asking for a change of the password.

52 Claims, 3 Drawing Sheets

U.S. PATENT DOCUMENTS

| | | | |
|---|---|---|---|
| 5,577,254 | A | 11/1996 | Gilbert |
| 5,611,048 | A | 3/1997 | Jacobs |
| 5,659,617 | A | 8/1997 | Fischer |
| 5,694,595 | A | 12/1997 | Jacobs |
| 5,757,916 | A | 5/1998 | MacDoran |
| 5,793,952 | A | 8/1998 | Limsico |
| 5,864,683 | A | 1/1999 | Boebert |
| 5,896,499 | A | 4/1999 | McKelvey |
| 5,903,830 | A | 5/1999 | Joao et al. |
| 5,937,159 | A | 8/1999 | Meyers |
| 5,944,794 | A | 8/1999 | Okamoto |
| 5,987,440 | A | 11/1999 | O'Neil |
| 6,005,939 | A | 12/1999 | Fortenberry |
| 6,021,496 | A | 2/2000 | Dutcher |
| 6,044,465 | A | 3/2000 | Dutcher |
| 6,052,122 | A | 4/2000 | Sutcliffe |
| 6,065,054 | A | 5/2000 | Dutcher |
| 6,078,955 | A | 6/2000 | Konno |
| 6,081,893 | A | 6/2000 | Grawrock |
| 6,091,737 | A | 7/2000 | Hong |
| 6,092,199 | A | 7/2000 | Dutcher |
| 6,122,740 | A | 9/2000 | Andersen |
| 6,148,404 | A | 11/2000 | Yatsukawa |
| 6,157,618 | A | 12/2000 | Biss |
| 6,198,824 | B1 | 3/2001 | Shambroom |
| 6,249,282 | B1 | 6/2001 | Sutcliffe |
| 6,321,338 | B1 | 11/2001 | Porras |
| 6,334,121 | B1 | 12/2001 | Primeaux |
| 6,339,828 | B1 | 1/2002 | Grawrock |
| 6,405,318 | B1 | 6/2002 | Rowland |
| 6,446,092 | B1 | 9/2002 | Sutter |
| 6,470,450 | B1 | 10/2002 | Langford et al. |
| 6,772,332 | B1 | 8/2004 | Boebert et al. |

FOREIGN PATENT DOCUMENTS

| | | |
|---|---|---|
| EP | 1076279 | 2/2001 |

OTHER PUBLICATIONS

Chien, H. et al. "Impersonation Attack on Tan-Shu's Remote Login Scheme." Electronics Letters, Jul. 6, 2000.

Harn, L. "A Public-Key Based Dynamic Password Scheme." Symposium on Applied Computing, Apr. 3-5, 1991.

Joncheray, L. "A Simple Active Attack Against TCP." Merit Network, Inc., Apr. 24, 1995.

Li, L. et al. "A Remote Password Authentication Scheme for Multiserver Architecture Using Neural Networks." IEEE Transactions on Neural Networks, Nov. 2001.

Sandirigame, M. et al. "Simple and Secure Password Authentication Protocol." IEICE Transactions on Communications, Jun. 2000.

Wu, T. "Remote Login Authentication Scheme Based on a Geometric Approach." Computer Communications, Dec. 1995.

Yen, S. et al. "Shared Authentication Token Secure Against Replay and Weak Key Attacks." Information Processing Letters, Apr. 28, 1997.

* cited by examiner

USING TRUSTED COMMUNICATION CHANNEL TO COMBAT USER NAME/PASSWORD THEFT

This application is a continuation of U.S. patent application Ser. No. 10/323,230, filed Dec. 18, 2002 now U.S. Pat. No. 6,938,167.

FILED OF THE INVENTION

The invention relates to computer security. More particularly, the invention relates to a trusted communication channel to combat user name/password theft.

BACKGROUND OF THE INVENTION

Discussion of the Prior Art

Malicious individuals employ various schemes to steal user name and password pairs from real users in the computer system. A common scenario for such theft is to "spoof" an official page of a system and lure a user into entering a user name and password into the system. The attacker then logs in and changes the compromised password to preclude use thereof by the true user, and ensure completion of the theft. In some cases, the attacker must immediately use the stolen password, for example where there is a time sensitive component, such as a Secure ID component.

FIG. 1 is a schematic flow diagram that shows a user 10 logged in to a system 12 (as indicated by numeric designator (1)). A malicious individual 18 generates a message 14, for example indicating to the user 10 that they might win a corporate incentive and that details with regard to the incentive are provided at a website, e.g. "go to xyz." The message is provided to the user 10 as indicated on FIG. 1 by the numeric designator (2).

The user follows the link, as indicated on FIG. 1 by the numeric designator (3). At the end of the link, there is a page 16 which the user had been lead to believe is within the company system, i.e. which is a trusted page, but which is in fact an outside, i.e. untrusted, page. The user is asked to type in the user name and/or password to verify that they are entitled to receive the reward promised at the site. Unwittingly, the user enters this information and the malicious individual is thereafter able to capture the user's name and password, as indicated on FIG. 1 by the numeric designator (4). Thereafter, the malicious individual can log into the system, change the user's password, and steal information from the account. This is indicated on FIG. 1 by the numeric designator (5).

It would be advantageous to provide a technique for using a trusted communication channel to combat user name/password theft.

SUMMARY OF THE INVENTION

The invention provides a technique for defining a system with enhanced trust. In one embodiment of the invention, an immediate contact is made with the user on the enhanced trust system when a compromise is first detected, e.g. when there is a second log in attempt from another location. Using trusted communications channels, the service can often contact the compromised user and ask for confirmation of the results, i.e. to change password or login, from a reduced trust machine. As a result, even if an attacker steals a password, the true user on the enhanced trust machine is able to preclude a login or preclude a password change. In each case, if the user of the enhanced trust machine does not respond within some short period of time, then a less trusted machine can be allowed to proceed.

The invention comprehends an enhanced trust machine, which is a machine where the user is currently logged in at the time that the second, less trusted machine attempts a login.

DETAILED DESCRIPTION OF THE INVENTION

Figure 1:
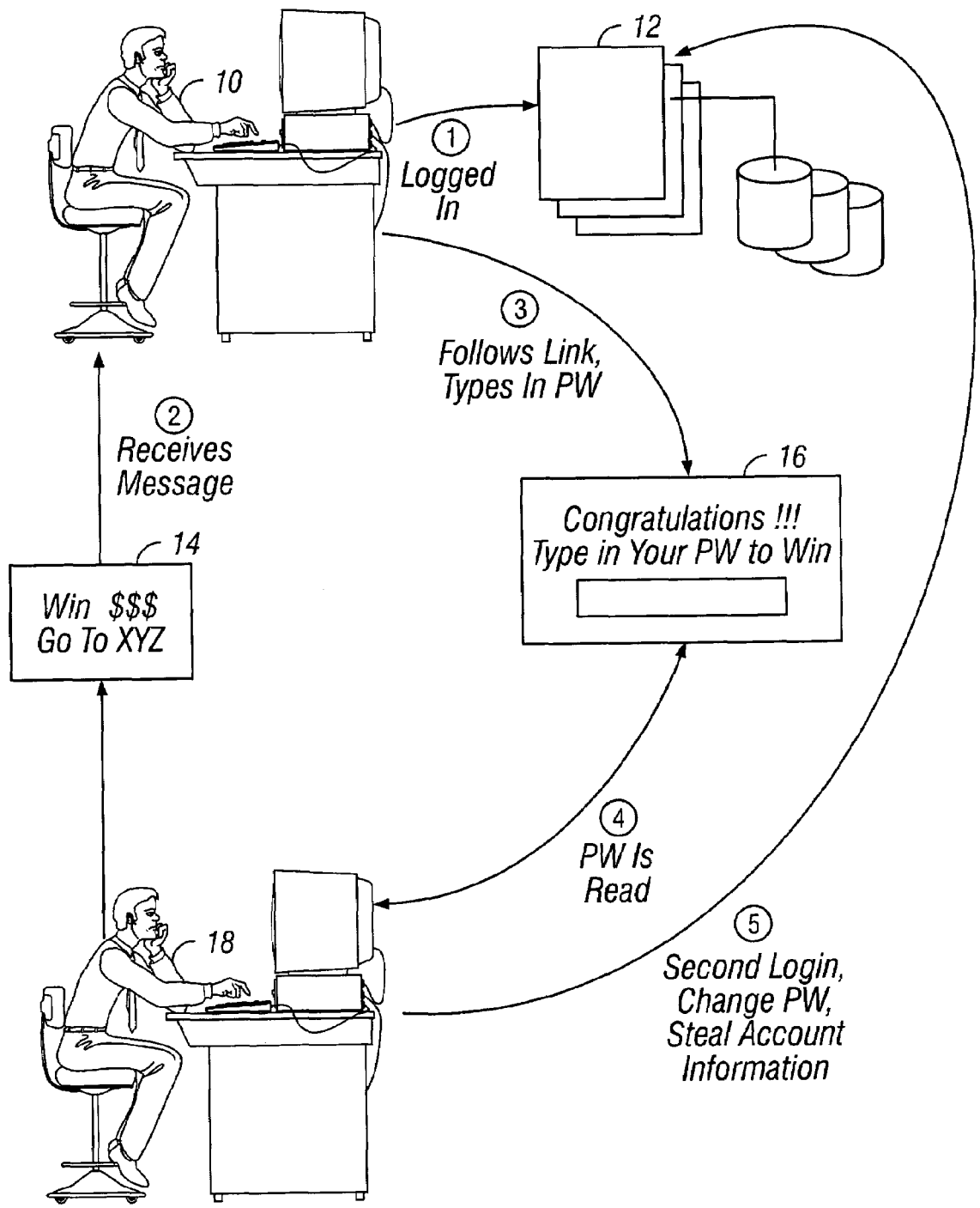
FIG. 1 is a schematic flow diagram showing a technique that is used to "spoof" a user name and password.

In general, for security, there are three classes of identification;
What you have;
What you know; and
What you are.

Examples of the first item include possession of a specific piece of hardware; the second item is exemplified by a password; and the third item is a biometric indicator, such as fingerprint or voiceprint. The invention operates with the assumption that a machine that is used extensively by a user is tagged as a machine that has enhanced trust. For example, if a user comes to their workstation everyday and uses the same machine, then the system develops experience with regard to the user's work patterns and expects that that machine is used by the user. Thus, the trust of the user being at that machine is enhanced. In the preferred embodiment of the invention, this is done by recording the number of times the given user has logged in from a given machine, and storing evidence of that history locally, possibly signed by a service to preclude forgery. At a minimum, the fact that a machine has a current active login assures that the machine is relatively more trusted than a machine that has neither a current, nor prior login by a given user. Specifically, the invention tags machines to create an additional "what you have" to add to the current password "what you know." Modern authentication theory suggests that two out of these three classes of identification are needed for significant assurance of identity. The invention recognizes this aspect of security theory and uses the concept of tagging and verification to prevent forged authentication, such as stolen passwords.

It is difficult, if not almost impossible, to prevent spoofing of official pages, for example where innocent victims are lured into supplying user names and passwords. One aspect of the invention uses the provisions of online services, such as AOL's AIM service, to make an immediate machine-to-human connection to the most likely valid user. The fact that many companies use a time-varying password generation scheme, such as secure ID, to generate a random number as a function of the time and day, provides assurance that an attacker must immediately use a compromised password. However, the invention is also useful in other password generation schemes. Because most passwords are comprised while the users are still online, the invention takes advantage of the fact that it is possible to reach the online user.

With credit cards, charges that are exceptional in nature often induce a credit card agency to contact the person directly for additional authentication. In this invention, instant messaging technology is used as the contact mechanism. One embodiment of the invention uses current and prior login history to establish a pattern of actions, i.e. experience, and detects suspicious logins and password changes. The public key system commonly known as PGP (Pretty Good Privacy) uses a history of communications to establish a trust relationship with a person and the person's key. Thus, PGP includes the notion of basing trust on history. However, the invention herein recognizes that experiential information may be applied to password authentication and, when combined with machine tagging such as writing signed logs to a disk to identify a relative trust of a piece of hardware, that a ability to prevent spoofing of a system is provided. The result of this sort of defense almost completely precludes theft of internal passwords. It also gives the company employing such a system a rapid notification about such theft attempts, which can then be applied to attempt to blockade further efforts. For example, attempts to use stolen accounts from related blocks of IP addresses machines are then implicitly listed as being untrustworthy.

Thus, the invention comprises technology for defining a machine as being a machine having enhanced trust, wherein a messaging technology is used to make immediate contact with the user on the enhanced trust system. Using such communications channels, the invention provides a mechanism that can contact the compromised user and ask for confirmation for results, i.e. to change a password or even to login, with regard to a reduced trust machine. Thus, even if an attacker steals a password, the true user on the enhanced trust machine is able to preclude a login or preclude a password change. In each case, if the user on the enhanced trust machine does not respond within some short period of time, then a less trusted machine is allowed to proceed, should this be desired.

The invention presently comprises an enhanced trust machine, which is a machine where the user is currently logged in at the time a second, less trusted machine attempts a login.

Figure 2:
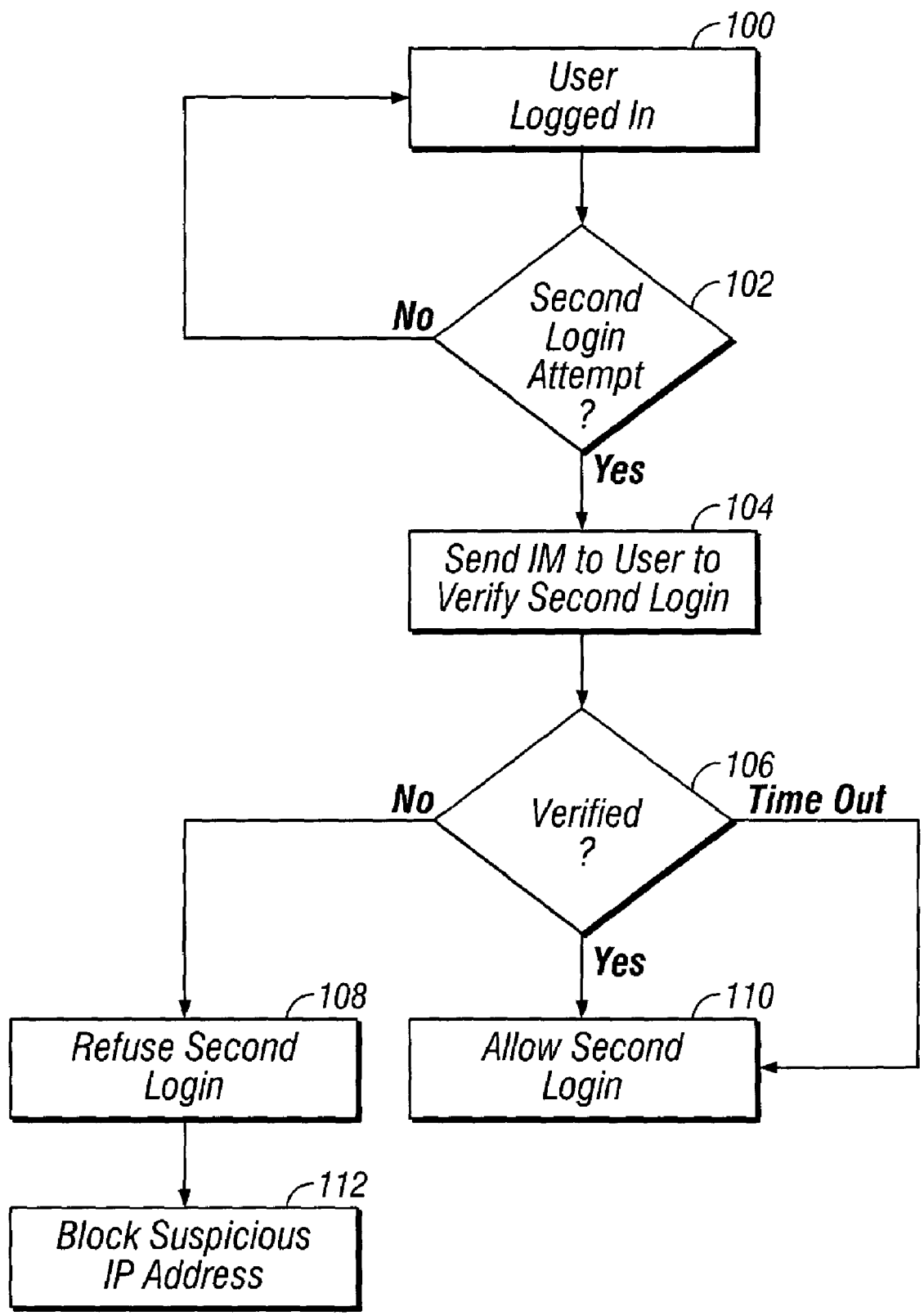
FIG. 2 is a flow diagram showing a technique for using enhanced trust to combat user name and password theft according to a first embodiment of the invention.

FIG. 2 is a flow diagram of a preferred embodiment of the invention in which a user is logged into a system (100). If a second login attempt is made (102), then the system sends an Instant Message to the user logged in at the first, enhanced trust location (104) to verify that the second login is authorized (106). If the user of the enhanced trust machine confirms that the user of the less trusted machine is properly permitted to login, for example by retyping a password, or typing a special password, then the less trusted machine is allowed to login (110). Likewise, if there is a timeout, indicating that the user logged in at the initial machine is not responding, for example because they have walked away from the machine and are now walking to another location, then the user is typically allowed to login as well. If the user responds to the instant message that there is no permission or no desire to login at the second, less trusted machine, then second login is refused (108). In this case, the second machine may be added to a filter list which blocks the machine or gives rise to an investigation the machine as having a suspicious IP address (112).

Figure 3:
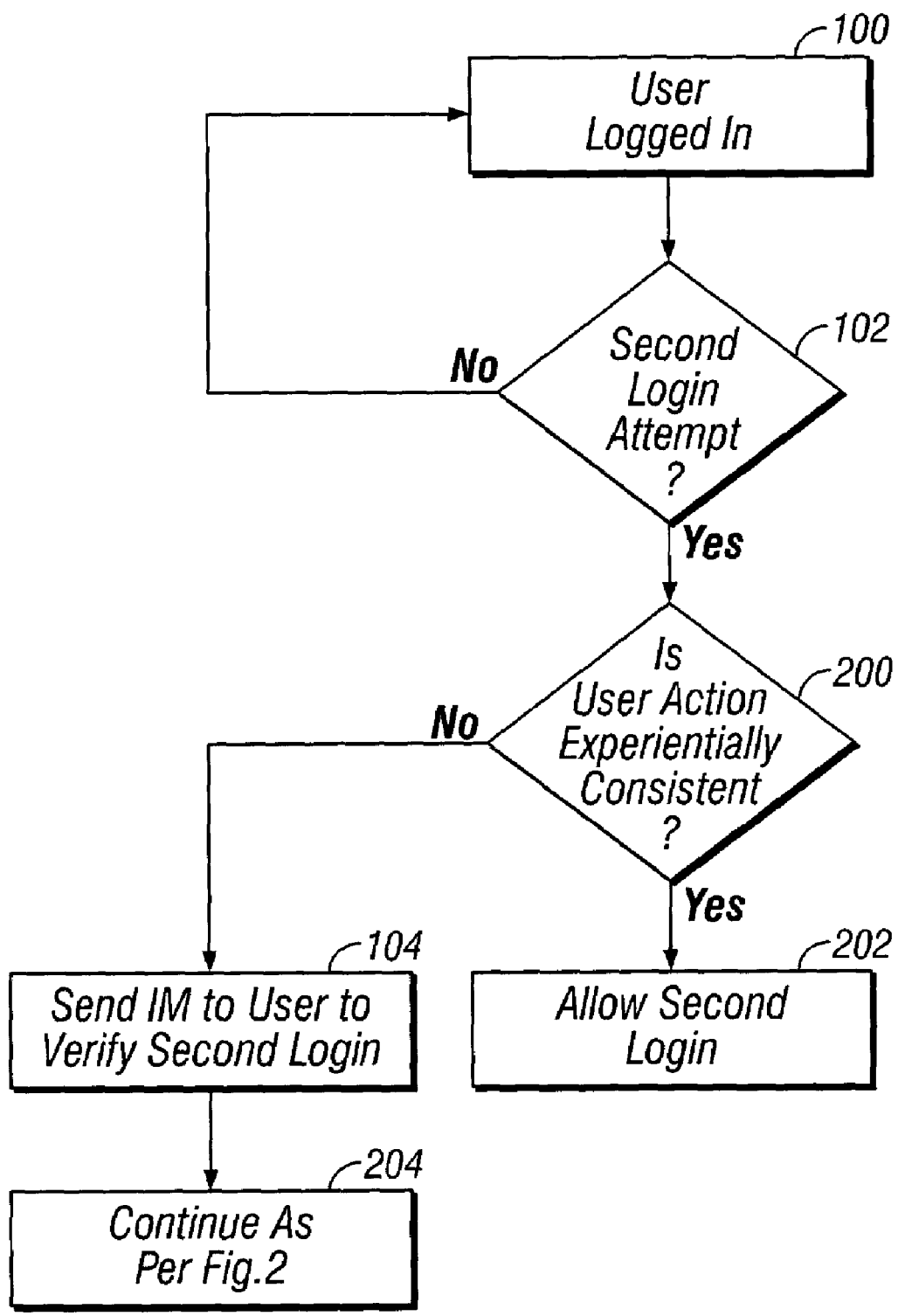
FIG. 3 is a flow diagram showing a system for using enhanced trust to combat user name and password theft according to a second embodiment of invention.

FIG. 3 is a flow diagram which shows an alternative embodiment of the invention in which the concept of trust is based upon experience. In FIG. 3, a user is logged in (100) when a second login attempt is made (102). In this case, the system looks to see if the user action is consistent with system experience (200). For example, the system may determine that the machine at which the user is currently logged in is one that the user has used everyday over a period of time and that is therefore a trusted machine, while the second login attempt is being made from a less trusted machine, i.e. a machine from which the user has never logged in before. It may be that the user is in fact logging in from the second machine legitimately. In such case, the mechanism outlined in connection with FIG. 2 above can be applied, in which the system sends an instant message to the user at the first login to verify that the second login should be permitted (104). Thereafter, the mechanism is applied as set forth, for example in FIG. 2 (204). If the user action is consistent with experience, then the second login is allowed (202).

The concept of experiential trust can be based upon one or more of many factors, including the use of a particular machine over time by a user, the use of the system by the user within a particular geographic region, i.e. the user has never logged in outside of the United States, the use of a particular machine at given times of day, i.e. the user has never attempted to login at 4:00 AM, or any other relevant factors. The forgoing situations are provided by way of example, and those skilled in the art will appreciate the various other bases for experience may be incorporated into this system. Furthermore, while the invention is described in connection with the use of an instant messaging mechanism for notifying a user of a trusted machine that there is an attempt to access the system using a less trusted machine, those skilled in the art will appreciate that the mechanism need not be instant messaging, but could involve the use of any other channel, such as a pager, a telephone, or other messaging systems. A key point is that the user of the trusted machine is notified promptly that an attempt is being made to login at a remote location. Further, while the invention is described as providing notification to the user at a trusted machine when an attempt is made to change a password or login identification from an untrusted machine, the system may tolerate the use of an untrusted machine so long as no attempt is made to change the password or user name. In such case, any attempt to change the password or user name requires the use of some further evidence of trustworthiness at the less trusted machine, for example the user would have to provide a further password that had previously been entered into the system but which has not been previously used as part of the current session. Absent this further proof, an instant message is sent to the user at the trusted machine and the mechanism herein described is invoked.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

The invention claimed is:

1. A method for using a trusted communication channel to combat user name/password theft, comprising the steps of:
   logging in a user to a trusted instant messaging system via a network connection, said instant message system comprising at least one trusted communication channel;
   detecting an access attempt from an untrusted system;
   making an immediate contact with said user via said trusted communication channel by way of an instant message when said access attempt from said untrusted system is first detected;
   asking said user to confirm whether or not access via said untrusted system should be authorized by way of a return instant message; and
   enabling or denying said access via said untrusted system in response to said confirmation.

2. The method of claim 1, wherein if said user of said trusted instant messaging system does not respond within a predetermined period of time by way of a return instant message, then said untrusted system is enabled with said access.

3. The method of claim 1, wherein a trusted instant messaging system is a system where said user is currently logged in at a time that said untrusted system attempts to gain access.

4. The method of claim 1, wherein a trusted instant messaging system is a system where said user has been granted access repeatedly over a course of time.

5. The method of claim 4, further comprising the step of:
tagging at least one previously untrusted system that is used extensively by said user as a system that is trusted.

6. The method of claim 1, further comprising the step of:
developing experience with regard to work patterns of said user and an expectation that a particular system is used by said user.

7. The method of claim 6, further comprising the steps of:
recording a history of number of times said user has logged in from a particular system; and
storing evidence of said history, optionally signed by a service to preclude forgery.

8. The method of claim 1, wherein a system having current active access is considered relatively more trusted than a system that has either does not have current access, or has not had prior access, by a given user.

9. The method of claim 1, further comprising the steps of:
tagging a system; and
verifying access to prevent forged authentication.

10. The method of claim 1, further comprising the step of:
using a random password generation scheme.

11. The method of claim 1, further comprising the step of:
using current and prior login history to establish a pattern of actions to detect suspicious logins and/or password changes.

12. The method of claim 1, further comprising the step of:
applying experiential information to password authentication; and
tagging a system to identify relative trust of said system.

13. The method of claim 1, further comprising the step of:
capturing system addresses for systems which attempt to use stolen accounts.

14. A method for determining if a system is a trusted system, comprising the steps of:
detecting an access attempt at an untrusted system;
using an instant messaging system to make immediate contact with a user of a trusted system;
asking said user for confirmation with regard to one or more actions to be taken in connection with said untrusted system; and
precluding said one or more actions if said user refuses to provide affirmative conformation.

15. The method of claim 14, further comprising the step of:
adding said untrusted system to a filter list which performs any of blocking access by said untrusted system and instituting an investigation.

16. An apparatus for using enhanced trust to combat user name/password theft in a network, comprising:
a mechanism for detecting an access attempt from an untrusted system;
an instant messaging system for making an immediate contact with a user of a trusted system via a network connection when said access attempt from said untrusted system is first detected;
a mechanism for asking said user to confirm whether or not access via said untrusted system should be authorized; and
a mechanism for enabling or denying said access via said untrusted system in response to said confirmation.

17. The apparatus of claim 16, wherein if said user of said trusted system does not respond within a predetermined period of time, then said untrusted system is enabled with said access.

18. The apparatus of claim 16, wherein a trusted system is a system where said user is currently logged in at a time that said untrusted system attempts to gain access.

19. The apparatus of claim 16, wherein a trusted system is a system where said user has been granted access repeatedly over a course of time.

20. The apparatus of claim 19, further comprising:
a mechanism for tagging a system that is used extensively by said user as a system that is trusted.

21. The apparatus of claim 16, further comprising:
a mechanism for developing experience with regard to work patterns of said user, and an expectation that a particular system is used by said user.

22. The apparatus of claim 21, further comprising:
a mechanism for recording a history of number of times said user has logged in from a particular system; and
a storage means for storing evidence of said history, optionally signed by a service to preclude forgery.

23. The apparatus of claim 16, wherein a system having current active access is considered relatively more trusted than a system that has either does not have current access, or has not had prior access, by a given user.

24. The apparatus of claim 16, further comprising:
a mechanism for tagging a system; and
a mechanism for verifying access to prevent forged authentication.

25. The apparatus of claim 16, further comprising:
a random password generation scheme for generating a random number, wherein an attacker must immediately use a compromised password.

26. The apparatus of claim 16, further comprising:
a mechanism for using current and prior login history to establish a pattern of actions to detect suspicious logins and/or password changes.

27. The apparatus of claim 16, further comprising:
a mechanism for applying experiential information to password authentication; and
a mechanism for tagging a system to identify relative trust of said system.

28. The apparatus of claim 16, further comprising:
a mechanism for capturing system addresses for systems which attempt to use stolen accounts.

29. An apparatus for determining if a system is a trusted system, comprising:
a mechanism for logging a user into a trusted instant messaging system via a network connection, said instant message system comprising at least one trusted communication channel;
a mechanism for detecting an access attempt at an untrusted system;
a means for making immediate contact with a user of a trusted system with the messaging system using the at least one trusted communication channel;
a mechanism for asking said user for confirmation with regard to one or more actions to be taken in connection with said untrusted system; and
a mechanism for precluding said one or more actions if said user refuses to provide affirmative conformation.

30. The apparatus of claim 29, further comprising:
a filter list of untrusted systems, which performs any of blocking access by said untrusted system and instituting an investigation.

31. A method for using a trusted communication channel to combat user name/password theft, comprising the steps of:
   detecting an access attempt from an untrusted system;
   making an immediate contact with a user of a trusted system when said access attempt from said untrusted system is first detected;
   asking said user to confirm whether or not access via said untrusted system should be allowed; and
   permitting or denying said access via said untrusted system in response to said confirmation
   developing experience with regard to work patterns of said user and an expectation that a particular system is used by said user,
   recording a history of number of times said user has logged in from a particular system; and
   storing evidence of said history, optionally signed by a service to preclude forgery.

32. The method of claim 31, wherein if said user of said trusted system does not respond within a predetermined period of time, then said untrusted system is allowed said access.

33. The method of claim 31, wherein a trusted system is a system where said user is currently logged in at a time that said untrusted system attempts to gain access.

34. The method of claim 31, wherein a trusted system is a system where said user has been granted access repeatedly over a course of time.

35. The method of claim 34, further comprising the step of:
   tagging a system that is used extensively by said user as a system that is trusted.

36. The method of claim 31, wherein a system having current active access is considered relatively more trusted than a system that has either does not have current access, or has not had prior access, by a given user.

37. The method of claim 31, further comprising the steps of:
   tagging a system; and
   verifying access to prevent forged authentication.

38. The method of claim 31, further comprising the step of: using a random password generation scheme.

39. The method of claim 31, further comprising the step of: using current and prior login history to establish a pattern of actions to detect suspicious logins and/or password changes.

40. The method of claim 31, further comprising the step of: applying experiential information to password authentication; and
   tagging a system to identify relative trust of said system.

41. The method of claim 31, further comprising the step of: capturing system addresses for systems which attempt to use stolen accounts.

42. An apparatus for using enhanced trust to combat user name/password theft, comprising:
   a mechanism for detecting an access attempt from an untrusted system;
   a messaging system for making an immediate contact with a user of a trusted system when said access attempt from said untrusted system is first detected;
   a mechanism for asking said user to confirm whether or not access via said untrusted system should be allowed; and
   a mechanism for permitting or denying said access via said untrusted system in response to said confirmation;
   a mechanism for developing experience with regard to work patterns of said user, and an expectation that a particular system is used by said user;
   a mechanism for recording a history of number of times said user has logged in from a particular system; and
   a storage means for storing evidence of said history, optionally signed by a service to preclude forgery.

43. The apparatus of claim 42, wherein if said user of said trusted system does not respond within a predetermined period of time, then said untrusted system is allowed said access.

44. The apparatus of claim 42, wherein a trusted system is a system where said user is currently logged in at a time that said untrusted system attempts to gain access.

45. The apparatus of claim 42, wherein a trusted system is a system where said user has been granted access repeatedly over a course of time.

46. The apparatus of claim 45, further comprising:
   a mechanism for tagging a system that is used extensively by said user as a system that is trusted.

47. The apparatus of claim 42, wherein a system having current active access is considered relatively more trusted than a system that has either does not have current access, or has not had prior access, by a given user.

48. The apparatus of claim 42, further comprising:
   a mechanism for tagging a system; and
   a mechanism for verifying access to prevent forged authentication.

49. The apparatus of claim 42, further comprising:
   a random password generation scheme for generating a random number, wherein an attacker must immediately use a compromised password.

50. The apparatus of claim 42, further comprising:
   a mechanism for using current and prior login history to establish a pattern of actions to detect suspicious logins and/or password changes.

51. The apparatus of claim 42, further comprising:
   a mechanism for applying experiential information to password authentication; and
   a mechanism for tagging a system to identify relative trust of said system.

52. The apparatus of claim 42, further comprising:
   a mechanism for capturing system addresses for systems which attempt to use stolen accounts.

* * * * *